US012317001B2

(12) United States Patent
Gwock et al.

(10) Patent No.: US 12,317,001 B2
(45) Date of Patent: May 27, 2025

(54) METHOD AND SYSTEM FOR PROCESSING CONFERENCE USING AVATAR

(71) Applicant: LINE Plus Corporation, Seongnam-si (KR)

(72) Inventors: Jungnam Gwock, Seongnam-si (KR); Geum Yong Yoo, Seongnam-si (KR); Snow Kwon, Seongnam-si (KR); Ohik Kwon, Seongnam-si (KR)

(73) Assignee: LINE Plus Corporation, Seongnam-si (KR)

( * ) Notice: Subject to any disclaimer, the term of this patent is extended or adjusted under 35 U.S.C. 154(b) by 254 days.

(21) Appl. No.: 17/947,662

(22) Filed: Sep. 19, 2022

(65) Prior Publication Data

US 2023/0017421 A1 Jan. 19, 2023

Related U.S. Application Data

(63) Continuation of application No. PCT/KR2020/003874, filed on Mar. 20, 2020.

(51) Int. Cl.
*H04N 7/15* (2006.01)
*G06T 7/70* (2017.01)
(Continued)

(52) U.S. Cl.
CPC .............. *H04N 7/157* (2013.01); *G06T 7/70* (2017.01); *H04N 7/147* (2013.01); *H04N 7/152* (2013.01);
(Continued)

(58) Field of Classification Search
None
See application file for complete search history.

(56) References Cited

U.S. PATENT DOCUMENTS 7,139,767 B1 * 11/2006 Taylor .................... G06F 16/78
707/999.102
9,424,678 B1 * 8/2016 Enakiev ................. G01B 11/24
(Continued)

FOREIGN PATENT DOCUMENTS

JP          11-328124 A      11/1999
JP          2001-94963 A      4/2001
(Continued)

OTHER PUBLICATIONS

JP2014225801A with English Translation (Year: 2014).*
(Continued)

*Primary Examiner* — Quoc D Tran
(74) *Attorney, Agent, or Firm* — Sughrue Mion, PLLC

(57) ABSTRACT

A non-transitory computer-readable recording medium may storing instructions that, when executed by a processor, cause the processor to set a communication session for a conference in which a plurality of users participates through a server, transmit, to the server, an identifier of an avatar to be represented on a virtual space for the conference and coordinate information of the avatar in the virtual space, receive, from the server, resources of neighboring avatars selected based on the coordinate information, transmit, to the server, motion data of the avatar through the communication session, receive, from the server, motion data of the neighboring avatars through the communication session, and represent the neighboring avatars on the virtual space based on the resources of the neighboring avatars and the motion data of the neighboring avatars.

20 Claims, 10 Drawing Sheets

(51) Int. Cl.
*H04N 7/14* (2006.01)
*G06V 40/16* (2022.01)
*G06V 40/20* (2022.01)

(52) U.S. Cl.
CPC .. *G06T 2207/30201* (2013.01); *G06V 40/176* (2022.01); *G06V 40/23* (2022.01)

(56) References Cited

U.S. PATENT DOCUMENTS

| | | | | |
|---|---|---|---|---|
| 9,532,004 | B1* | 12/2016 | Metter | H04N 7/152 |
| 11,983,807 | B2* | 5/2024 | Chen | H04L 51/02 |
| 2011/0296324 | A1* | 12/2011 | Goossens | G06Q 50/01 |
| | | | | 715/763 |
| 2017/0091535 | A1 | 3/2017 | Yu et al. | |
| 2017/0302709 | A1* | 10/2017 | Jones | G06Q 10/10 |

FOREIGN PATENT DOCUMENTS

| | | | |
|---|---|---|---|
| JP | 2014225801 A | * | 12/2014 |
| JP | 2017-102639 A | | 6/2017 |
| JP | 2017-188020 A | | 10/2017 |
| JP | 2018-538593 A | | 12/2018 |
| JP | 2019-160295 A | | 9/2019 |
| KR | 10-2007-0043945 A | | 4/2007 |
| KR | 10-2010-0121420 A | | 11/2010 |
| KR | 10-2016-0095864 A | | 8/2016 |

OTHER PUBLICATIONS

International Search Report for PCT/KR2020/003874, dated Nov. 30, 2020.
Office Action issued Mar. 12, 2024 in Japanese Application No. 2022-552270.
Japanese Office Action dated Jul. 9, 2024 in Application No. 2022-552270.

* cited by examiner

METHOD AND SYSTEM FOR PROCESSING CONFERENCE USING AVATAR

CROSS-REFERENCE TO RELATED APPLICATION(S)

This application is a bypass continuation of International Application No. PCT/KR2020/003874, filed Mar. 20, 2020, in the Korean Intellectual Property Receiving Office, the contents of which are incorporated herein by reference in its entirety.

BACKGROUND

1. Field

The disclosure relates to a method and system for processing a conference using an avatar.

2. Description of Related Art

An avatar refers to a character that represents an individual online and, is gaining attention as an expression tool of a user for providing a realistic virtual environment through constant interaction with others in the virtual world. Such an avatar is being used in various fields, such as an advertisement, film production, game design, and teleconference.

However, the related arts only provide an avatar that simply performs a motion selected by a user from among preset motions (e.g., movements and/or facial expressions of the avatar) on a service in which a plurality of participants are present and do not express avatars that follow motions of participants in real time in the service.

SUMMARY

Provided is a conference processing method and system that may represent avatars of participants following motions of the participants on a virtual space sharable by the participants and may conduct a conference using the virtual space.

According to an aspect of the disclosure, a non-transitory computer-readable recording medium may store instructions that, when executed by a processor, cause the processor to set a communication session for a conference in which a plurality of users participates through a server, transmit, to the server, an identifier of an avatar to be represented on a virtual space for the conference and coordinate information of the avatar in the virtual space, receive, from the server, resources of neighboring avatars selected based on the coordinate information, transmit, to the server, motion data of the avatar through the communication session, receive, from the server, motion data of the neighboring avatars through the communication session, and represent the neighboring avatars on the virtual space based on the resources of the neighboring avatars and the motion data of the neighboring avatars.

The instructions, when executed, may further cause the processor to display the virtual space on which the avatar and the neighboring avatars are represented on a screen.

The instructions, when executed, may further cause the processor to receive the motion data in real time based on a real-time transmission protocol.

The instructions, when executed, may further cause the processor to, in response to receiving motion data of a new neighboring avatar, transmitting, to the server, a request for a resource of the new neighboring avatar, and receive the resource of the new neighboring avatar from the server.

The instructions, when executed, may further cause the processor to share voices of the plurality of users through the communication session or another communication session set separate from the communication session.

The motion data may include data related to at least one of poses and facial expressions of the plurality of users.

A pose of the avatar may be configured to include a plurality of bones, and the motion data may include an index of each of the plurality of bones, rotation information of each of the plurality of bones in a three-dimensional (3D) space, position information of each of the plurality of bones in the virtual space, and information on a current tracking state of each of the plurality of bones.

The motion data may include coefficient values calculated for a plurality of points predefined for a face of a person based on a face blendshape scheme.

According to an aspect of the disclosure, a conference processing method may include setting a communication session for a conference in which a plurality of users participates through a server, transmitting, to the server, an identifier of an avatar to be represented on a virtual space for the conference and coordinate information of the avatar in the virtual space, receiving, from the server, resources of neighboring avatars selected based on the coordinate information, transmitting, to the server, motion data of the avatar through the communication session, receiving, from the server, motion data of the neighboring avatars through the communication session, and representing the neighboring avatars on the virtual space based on the resources of the neighboring avatars and the motion data of the neighboring avatars.

According to an aspect of the disclosure, a conference processing method may include setting a communication session for a conference in which a plurality of users participates, receiving, for each of the plurality of users, an identifier of an avatar to be represented on a virtual space for the conference and coordinate information of the avatar in the virtual space, selecting neighboring avatars of an identified avatar based on the coordinate information, transmitting resources of the selected neighboring avatars to a terminal of a user corresponding to the identified avatar, receiving motion data of avatars from each of the plurality of users through the communication session, and transmitting the motion data of the selected neighboring avatars to the terminal of the user corresponding to the identified avatar through the communication session.

The receiving of the motion data of avatars through the communication session may include receiving motion data generated from terminals of the plurality of users based on a real-time transmission protocol in real time, and the transmitting of the motion data of the selected neighboring avatars may include transmitting the motion data of the selected neighboring avatars to the terminal of the user corresponding to the identified avatar based on the real-time transmission protocol.

The method may include, in response to the terminal of the user receiving motion data of a new neighboring avatar, receiving a resource request including an identifier of the new neighboring avatar from the terminal of the user corresponding to the identified avatar, acquiring a resource of the new neighboring avatar based on the identifier of the new neighboring avatar, and transmitting the acquired resource to the terminal of the user corresponding to the identified avatar.

The method may include mixing voices received from the plurality of users through the communication session or another communication session set separate from the communication session, and providing the mixed voices to the plurality of users.

The motion data may include data related to at least one of poses and facial expressions of the plurality of users.

The terminal of the user corresponding to the identified avatar may be configured to represent the selected neighboring avatars on the virtual space based on the resources of the selected neighboring avatars and the motion data of the selected neighboring avatars, and the virtual space on which the identified avatar and the neighboring avatars are represented may be displayed on a screen.

BRIEF DESCRIPTION OF DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION

Figure 1:
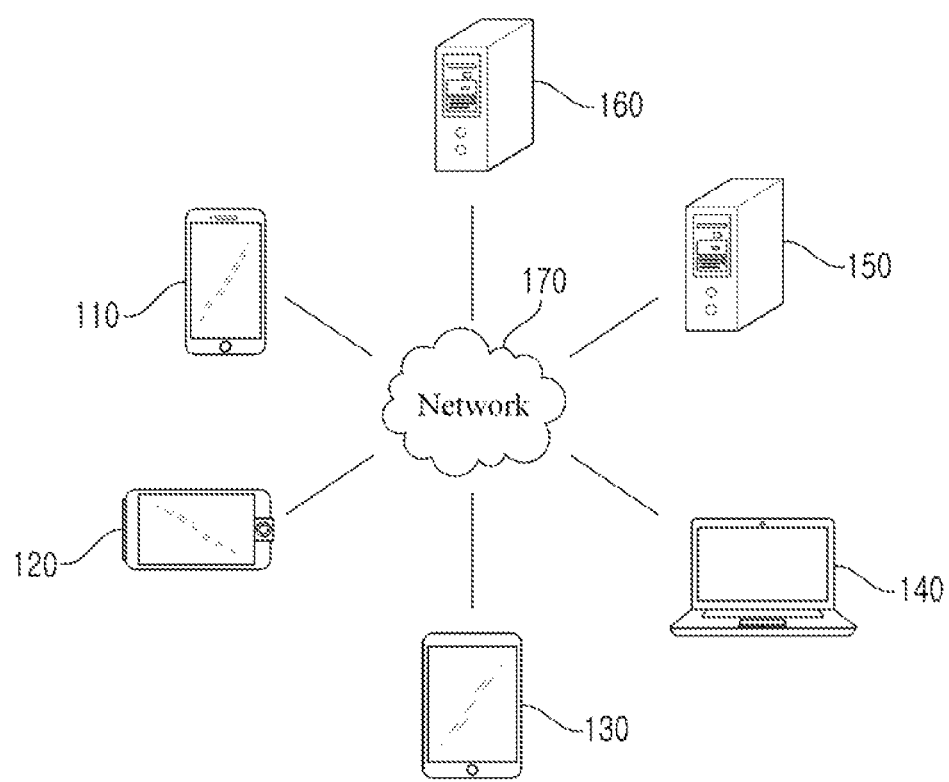
FIG. 1 is a diagram illustrating an example of a network environment according to an example embodiment.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

It should be noted that the figures are intended to illustrate the general characteristics of methods and/or structure utilized in certain example embodiments and to supplement the written description provided below. The drawings are not, however, to scale and may not precisely reflect the precise structural or performance characteristics of any given embodiment, and should not be interpreted as defining or limiting the range of values or properties encompassed by example embodiments.

Units and/or devices according to one or more example embodiments may be implemented using hardware and/or a combination of hardware and software. For example, hardware devices may be implemented using processing circuitry such as, but not limited to, a processor, central processing unit (CPU), a controller, an arithmetic logic unit (ALU), a digital signal processor, a microcomputer, a field programmable gate array (FPGA), a system-on-chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor), CPU, a controller, an ALU, a digital signal processor, a microcomputer, a microprocessor, etc., the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer record medium or device, capable of providing instructions or data to, or being interpreted by, a hardware device. The software also may be distributed over network coupled computer systems so that the software is stored and executed in a distributed fashion. In particular, for example, software and data may be stored by one or more computer readable record mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive, solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable record medium into the one or more storage devices and/or one or more computer processing devices using a drive mechanism. Such separate computer readable record medium may include a universal serial bus (USB) flash drive, a memory stick, a Blu-ray/digital versatile disc (DVD)/compact disc (CD)-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable record medium. Additionally, the computer programs, program code, instructions, or some combination thereof, may be loaded into the one or more storage devices and/or the one or more processors from a remote computing system that is configured to forward and/or distribute the computer programs, program code, instructions, or some combination thereof, over a network. The remote computing system may forward and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device. However, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

A conference processing system according to some example embodiments may be implemented by a computer device that implements at least one client and a computer device that implements at least one server. A conference processing method according to some example embodiments may be performed by at least one computer device included in the conference processing system. Here, a computer program according to an example embodiment may be installed and executed on the computer device and the computer device may perform the conference processing method according to example embodiments under control of the executed computer program. The aforementioned computer program may be stored in a computer-readable recording medium to implement the conference processing method in conjunction with the computer device.

FIG. 1 is a diagram illustrating an example of a network environment according to an example embodiment. Referring to FIG. 1, the network environment may include a plurality of electronic devices 110, 120, 130, and 140, a plurality of servers 150 and 160, and a network 170. FIG. 1 is provided as an example only. A number of electronic devices or a number of servers is not limited thereto. Also, the network environment of FIG. 1 is provided as one example of environments applicable to the example embodiments and an environment applicable to the example embodiments is not limited to the network environment of FIG. 1.

Each of the plurality of electronic devices 110, 120, 130, and 140 may be a fixed terminal or a mobile terminal that is configured as a computer device. For example, the plurality of electronic devices 110, 120, 130, and 140 may be a smartphone, a mobile phone, a navigation device, a computer, a laptop computer, a digital broadcasting terminal, a personal digital assistant (PDA), a portable multimedia player (PMP), a tablet personal computer (PC), and the like. For example, although FIG. 1 illustrates a shape of a smartphone as an example of the electronic device 110, the electronic device 110 used herein may refer to one of various types of physical computer devices capable of communicating with other electronic devices 120, 130, and 140, and/or the servers 150 and 160 over the network 170 in a wireless or wired communication manner.

The communication scheme is not limited and may include a near field wireless communication scheme between devices as well as a communication scheme using a communication network (e.g., a mobile communication network, wired Internet, wireless Internet, and a broadcasting network) includable in the network 170. For example, the network 170 may include at least one of network topologies that include a personal area network (PAN), a local area network (LAN), a campus area network (CAN), a metropolitan area network (MAN), a wide area network (WAN), a broadband network (BBN), and the Internet. Also, the network 170 may include at least one of network topologies that include a bus network, a star network, a ring network, a mesh network, a star-bus network, a tree or hierarchical network, and the like. However, they are provided as examples only.

Each of the servers 150 and 160 may be configured as a computer device or a plurality of computer devices that provides an instruction, a code, a file, content, a service, etc., through communication with the plurality of electronic devices 110, 120, 130, and 140 over the network 170. For example, the server 150 may be a system that provides a service to the plurality of electronic devices 110, 120, 130, and 140 connected over the network 170. For example, the service may be an instant messaging service, a game service, a group call service (or a voice conference service), a messaging service, a mail service, a social network service, a map service, a translation service, a financial service, a payment service, a search service, and a content providing service.

Figure 2:
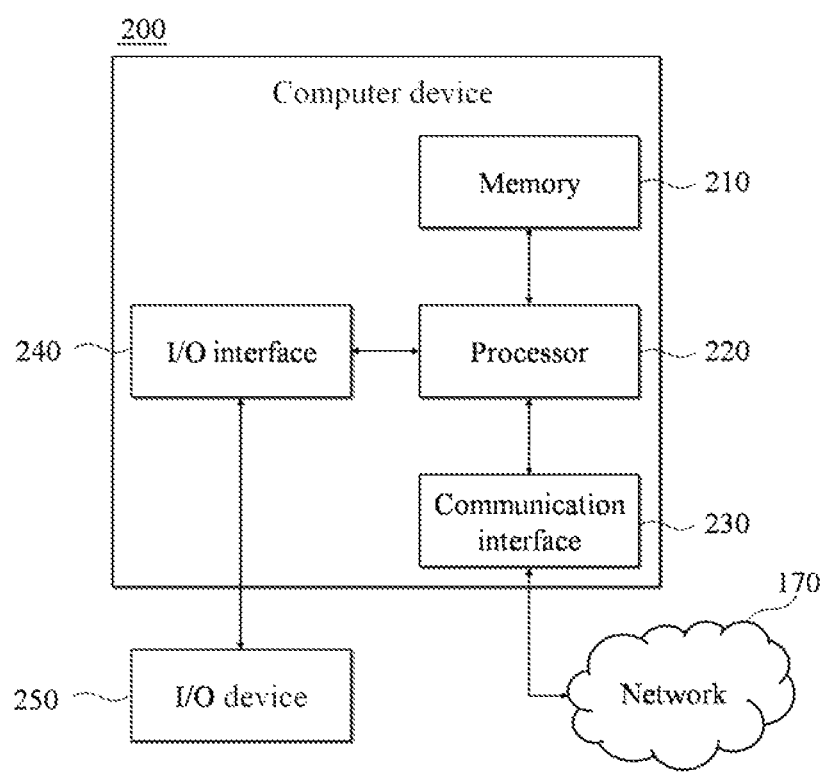
FIG. 2 is a diagram illustrating an example of a computer device according to an example embodiment.

FIG. 2 is a diagram illustrating an example of a computer device according to an example embodiment. Each of the plurality of electronic devices 110, 120, 130, and 140 or each of the servers 150 and 160 may be implemented by a computer device 200 of FIG. 2.

Referring to FIG. 2, the computer device 200 may include a memory 210, a processor 220, a communication interface 230, and an input/output (I/O) interface 240. The memory 210 may include a permanent mass storage device, such as a RAM, a ROM, and a disk drive, as a non-transitory computer-readable recording medium. The permanent mass storage device, such as ROM and a disk drive, may be included in the computer device 200 as a permanent storage device separate from the memory 210. Also, an OS and at least one program code may be stored in the memory 210. Such software components may be loaded to the memory 210 from another non-transitory computer-readable recording medium separate from the memory 210. The other non-transitory computer-readable recording medium may include a non-transitory computer-readable recording medium, for example, a floppy drive, a disk, a tape, a DVD/CD-ROM drive, a memory card, etc. According to other example embodiments, software components may be loaded to the memory 210 through the communication interface 230, instead of the non-transitory computer-readable recording medium. For example, the software components may be loaded to the memory 210 of the computer device 200 based on a computer program installed by files received over the network 170.

The processor 220 may be configured to process instructions of a computer program by performing basic arithmetic operations, logic operations, and I/O operations. The computer-readable instructions may be provided by the memory 210 or the communication interface 230 to the processor 220. For example, the processor 220 may be configured to execute received instructions in response to a program code stored in a storage device, such as the memory 210.

The communication interface 230 may provide a function for communication between the communication apparatus 200 and another apparatus, for example, the aforementioned storage devices. For example, the processor 220 of the computer device 200 may deliver a request or an instruction created based on a program code stored in the storage device such as the memory 210, data, and a file, to other apparatuses over the network 170 under control of the communication interface 230. Inversely, a signal, an instruction, data, a file, etc., from another apparatus may be received at the computer device 200 through the communication interface 230 of the computer device 200. For example, a signal, an instruction, data, etc., received through the communication interface 230 may be delivered to the processor 220 or the memory 210, and a file, etc., may be stored in a storage medium, for example, the permanent storage device, further includable in the computer device 200.

The I/O interface 240 may be a device used for interfacing with an I/O device 250. For example, an input device may include a device, such as a microphone, a keyboard, a mouse, etc., and an output device may include a device, such as a display, a speaker, etc. As another example, the I/O interface 240 may be a device for interfacing with a device in which an input function and an output function are integrated into a single function, such as a touchscreen. At least one of the I/O device 250 may be configured as a single device with the computer device 200. For example, a touchscreen, a microphone, a speaker, etc., of a smartphone may be included in the computer device 200.

Also, according to other example embodiments, the computer device 200 may include a greater or smaller number of components than the number of components of FIG. 2. For example, the computer device 200 may be configured to include at least a portion of the I/O device 250 or may further include other components, such as a transceiver and a database.

Figure 3:
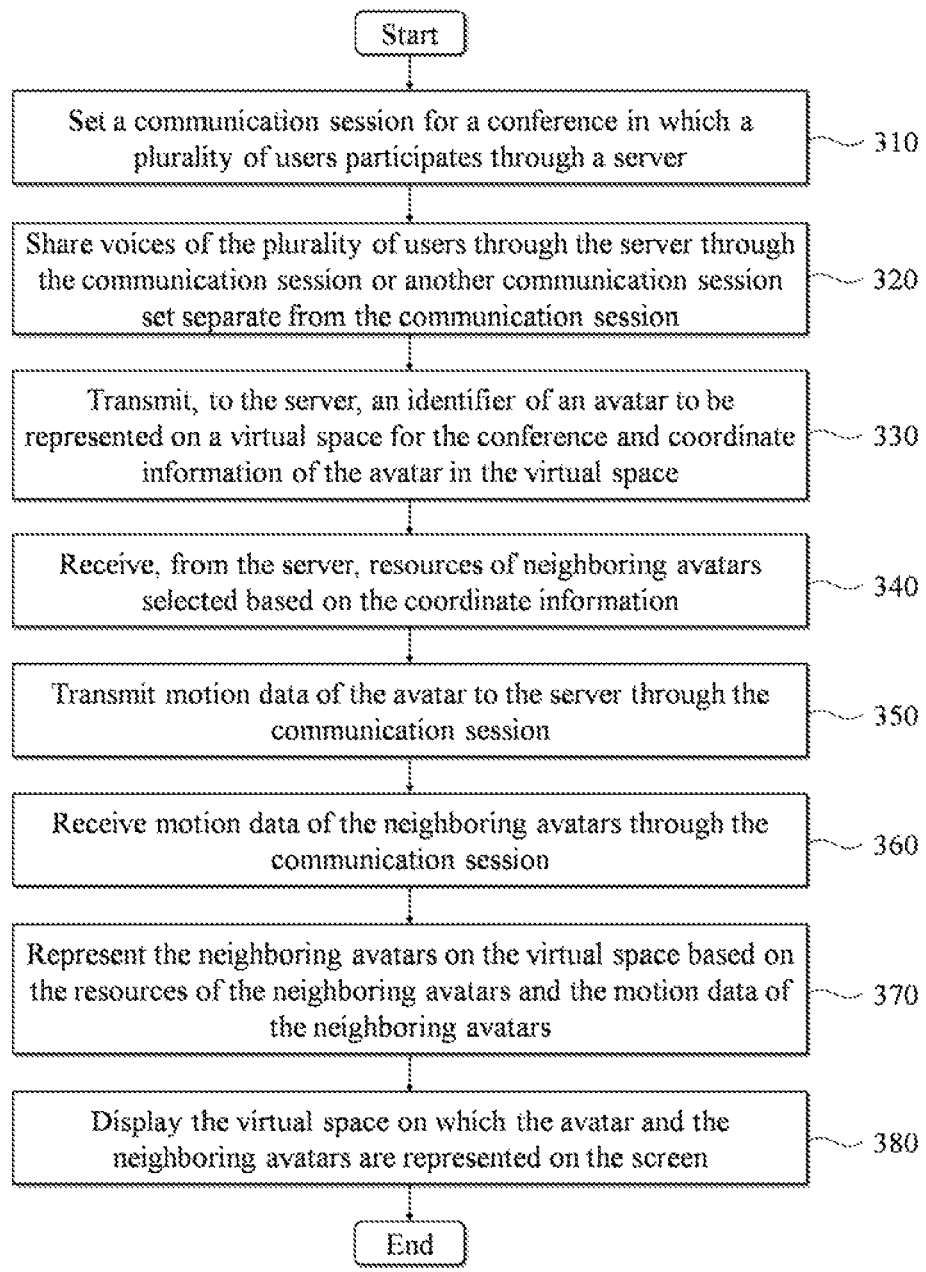
FIG. 3 is a flowchart illustrating an example of an conference processing method of a client according to an example embodiment.

FIG. 3 is a flowchart illustrating an example of an conference processing method of a client according to an example embodiment. The conference processing method according to the example embodiment may be performed by the computer device 200 that implements a client device. Here, the client device may be an entity that receives a conference service from a server under control of a client program installed in the client device. Here, the client program may correspond to an application for providing the conference service. Here, the processor 220 of the computer device 200 may be implemented to execute a control instruction according to a code of at least one computer program or a code of an OS included in the memory 210. Here, the processor 220 may control the computer device 200 to perform operations 310 to 380 included in the method of FIG. 3 in response to the control instruction provided from a code stored in the computer device 200.

In operation 310, the computer device 200 may set a communication session for a conference in which a plurality of users participates through a server. For example, the communication session may be set for terminals of a plurality of users that participates in a conference in such a manner that an arbitrary user opens the conference using a user interface provided through a conference service and then invites other users to the opened conference.

In operation 320, the computer device 200 may share voices of the plurality of users through the server through the communication session or another communication session set separate from the communication session. For example, the voice may be shared in such a manner that the server receives the voice of each of the plurality of users, mixes the received voices, and transmits the mixed voice to the plurality of users. Here, the mixed voice transmitted to a specific user may be audio data in which remaining voices excluding voice of the corresponding specific user are mixed. Depending on example embodiments, a communication protocol for transmission and reception of voice may differ from a communication protocol for transmission and reception of data described in the following. For example, the transmission and reception of the voice may be performed using a real-time transport protocol (RTP) and the transmission and reception of the data may be performed using a real-time streaming protocol (RTSP). Such operation 320 may be performed after operation 310, but may be performed in parallel with the following operations 330 to 380. Depending on example embodiments, operation 320 may be omitted.

In operation 330, the computer device 200 may transmit, to the server, an identifier of an avatar to be represented on a virtual space for the conference and coordinate information of the avatar in the virtual space. Here, each of the participants that participate in the conference may transmit an identifier and coordinate information of an avatar of each corresponding participant to the server and the server may verify a position of each of the avatars for the conference.

In operation 340, the computer device 200 may receive, from the server, resources of neighboring avatars selected based on the coordinate information. For example, for an identified avatar, the server may select avatars present within a preset distance from the identified avatar as neighboring avatars and may transmit resources of the selected neighboring avatars to the computer device 200 since the computer device 200 only needs to represent avatars that are likely to be displayed on a screen without a need to represent avatars of all participants in the conference. The identified avatar may correspond to an avatar that is pre-identified, predetermined based on type, location, etc., selected by a user or processor, etc. Here, a resource of an avatar may include data for representing the corresponding avatar on the screen.

In operation 350, the computer device 200 may transmit motion data of the avatar to the server through the communication session. For example, the computer device 200 may acquire motion data of the user by analyzing an image captured through a camera included in the computer device 200 and may transmit the motion data of the user to the server as motion data of the corresponding avatar. The motion data may include data related to at least one of a pose and a facial expression of the corresponding user. As another example embodiment, the motion data may include data of a motion selected in the computer device 200 by the corresponding user from among a plurality of preset motions. As still another example embodiment, the motion data may be extracted from an image or a video prestored in the computer device 200 or prestored on the web.

A pose of the avatar may be configured by including a plurality of bones. In this case, the motion data may include an index of each of the plurality of bones, rotation information of each of the plurality of bones in a three-dimensional (3D) space, position information of each of the plurality of bones in the virtual space, and information on a current tracking state of each of the plurality of bones. The computer device 200 may apply a pose of the user or a user-desired pose to the pose of the avatar using such motion data. Although a pose or a facial expression in a single frame is static, a change in the pose or the facial expression in a plurality of frames may lead to a movement of the avatar. Also, the motion data may include coefficient values calculated for a plurality of points predefined for a face of a person based on a face blendshape scheme. In this case, the computer device 200 may apply a facial expression of the user or a user-desired facial expression to the facial expression of the avatar using such motion data.

In operation 360, the computer device 200 may receive the motion data of the neighboring avatars through the communication session. For example, the computer device 200 may receive the motion data generated for the neighboring avatars in real time using a real-time transmission protocol. To generate a video screen for the conference, the motion data may be generated per frame of the video. For example, in the case of providing a video for the conference at 10 frame per second (fps), the motion data may be received ten times per second.

In operation 370, the computer device 200 may represent the neighboring avatars on the virtual space based on the resources of the neighboring avatars and the motion data of the neighboring avatars. While the computer device 200 represents the avatar on the virtual space using the resource of the avatar, avatars in which motions of participants are applied in real time may be represented on the virtual space by controlling a motion of the avatar using motion data received in real time.

From perspective of the computer device 200, motion data of a new neighboring avatar may be received according to appearance of the new avatar or according to movement of avatars. In this case, the computer device 200 may represent the new neighboring avatar on the virtual space by requesting the server for the resource of the new neighboring avatar and by receiving the resource of the new neighboring avatar from the server.

In operation 380, the computer device 200 may display the virtual space on which the avatar and the neighboring avatars are represented on the screen. Therefore, participants of the conference may conduct the conference using the virtual space on which the avatars of the participants are represented. Here, motions including poses or facial expressions of the participants or motions desired by the participants may be applied to the avatars in real time.

Figure 4:
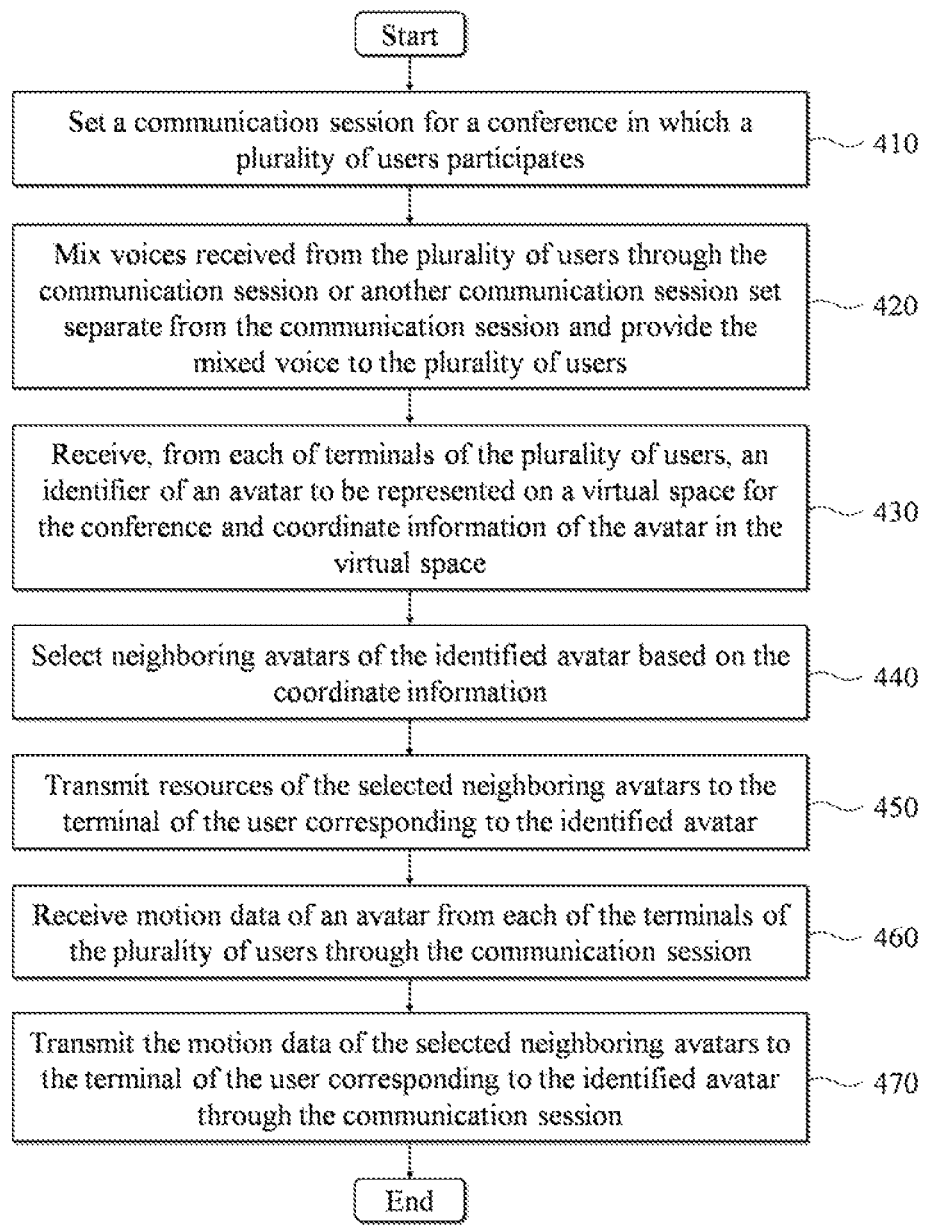
FIG. 4 is a flowchart illustrating an example of a conference processing method of a server according to an example embodiment.

FIG. 4 is a flowchart illustrating an example of a conference processing method of a server according to an example embodiment. The conference processing method according to the example embodiment may be performed by the computer device 200 that implements the server. Here, the server may be an entity that provides a conference service to a plurality of client devices each in which a client program is installed. Also, the client program may correspond to an application for the aforementioned service. Here, the processor 220 of the computer device 200 may be implemented to execute a control instruction according to a code of at least one computer program or a code of an OS included in the memory 210. Here, the processor 220 may control the computer device 200 to perform operations 410 to 470 included in the method of FIG. 4 according to a control instruction provided from a code stored in the computer device 200.

In operation 410, the computer device 200 may set a communication session for a conference in which a plurality of users participates. For example, an arbitrary user may open the conference using a user interface provided through a conference service and then invite other users to the opened conference, and the computer device 200 may set the communication session for the conference with respect to participants that include the arbitrary user and the invited other users.

In operation 420, the computer device 200 may mix voices received from the plurality of users through the communication session or another communication session set separate from the communication session and may provide the mixed voice to the plurality of users. Here, when mixing voice to be provided to a specific user, the computer device 200 may mix remaining voices excluding the voice of the specific user and may generate the mixed voice to be provided to the specific user.

In operation 430, the computer device 200 may receive, from each of terminals of the plurality of users, an identifier of an avatar to be represented on a virtual space for the conference and coordinate information of the avatar in the virtual space. Through this, the computer device 200 may verify positions of the avatars of all the participants of the corresponding conference.

In operation 440, the computer device 200 may select neighboring avatars of an identified avatar based on the coordinate information. As described above, for the identified avatar, the computer device 200 may select avatars present within a preset distance from the identified avatar as the neighboring avatars and may transmit resources of the selected neighboring avatars to a terminal of a user corresponding to the identified avatar since there is a need to represent avatars that are likely to be displayed on the screen without a need to represent avatars of all the participants in the conference from perspective of a terminal of a single user.

In operation 450, the computer device 200 may transmit resources of the selected neighboring avatars to the terminal of the user corresponding to the identified avatar. Here, the resource of the avatar may include data for representing the corresponding avatar on the screen. Therefore, the terminal of the corresponding user may represent the selected neighboring avatars on the virtual space using such resources.

In operation 460, the computer device 200 may receive motion data of an avatar from each of the terminals of the plurality of users through the communication session. As described above, each of the terminals of the users may acquire motion data of each corresponding user by analyzing an image captured through a camera included in the corresponding terminal and may transmit the motion data of the user to the server as motion data of a corresponding avatar. The motion data may include data related to at least one of a pose and a facial expression of the corresponding user. As another example embodiment, the motion data may also include data of a motion selected in the computer device 200 by the corresponding user from among a plurality of preset motions. As still another example embodiment, the motion data may be extracted from an image or a video prestored in the computer device 200 or prestored on the web.

A pose of the avatar may be configured by including a plurality of bones. In this case, the motion data may include an index of each of the plurality of bones, rotation information of each of the plurality of bones in a 3D space, position information of each of the plurality of bones in the virtual space, and information on a current tracking state of each of the plurality of bones. Also, the motion data may include coefficient values calculated for a plurality of points predefined for a face of a person based on a face blendshape scheme.

In operation 470, the computer device 200 may transmit the motion data of the selected neighboring avatars to the terminal of the user corresponding to the identified avatar through the communication session. In this case, each of the terminals of the users may apply a pose and/or facial expression of the corresponding user or a pose and/or facial expression desired by the corresponding user to the neighboring avatars using the transmitted motion data. Although a pose or a facial expression in a single frame is static, a change in the pose or the facial expression in a plurality of frames may lead to a movement of the avatar. To this end, the computer device 200 may receive motion data generated from each of the terminals of the plurality of users using the real-time transmission protocol in operation 460 and may transmit the motion data of the selected neighboring avatars to the terminal of the user using the real-time transmission protocol in operation 470. Through real-time delivery of motion data, it is possible to provide the conference service in which avatars to which motions of users are applied in real time participate rather than the conference service in which the avatars simply participate.

As described above, from perspective of the terminal of the user, motion data of a new neighboring avatar may be received according to appearance of the new avatar or according to movement of avatars. In this case, the terminal of the user may request the server for a resource of the new neighboring avatar. For example, in response to the terminal of the user receiving the motion data of the new neighboring avatar, the computer device 200 may receive a resource request that includes an identifier of the new neighboring avatar from the terminal of the user. In this case, the computer device 200 may acquire a resource of the new neighboring avatar based on the identifier of the new neighboring avatar and may transmit the acquired resource to the terminal of the user. Therefore, the terminal of the user may represent the new neighboring avatar on the virtual space by receiving the resource of the new neighboring avatar from the server.

FIGS. 5, 6, 7 and 8 are diagrams of an avatar representation process according to an example embodiment. FIGS. 5 to 8 illustrate a first user 510, a second user 520, an application server (AS) 530, a voice mixer (VMX) 540, a motion mixer (MMX) 550, and a character manager (CM) 560.

Here, each of the first user 510 and the second user 520 may be a terminal as a physical device substantially used by a corresponding user to use a service. This terminal may be implemented in a form of the computer device 200 of FIG. 2. For example, the first user 510 may be implemented in a form of the computer device 200 of FIG. 2 and may perform the conference processing method by way of the processor 220 included in the computer device 200 under control of an application installed and running on the computer device 200, to use a conference service. The first user 510 and the second user 520 that use the conference service through this application may be clients of the conference service.

Also, each of the AS 530, the VMX 540, the MMX 550, and the CM 560 may be a software module that is implemented in individual physical devices or implemented in a single physical device. The physical device in which the AS 530, the VMX 540, the MMX 550, and/or the CM 560 are implemented may also be implemented in a form of the computer device 200 of FIG. 2. The AS 530, the VMX 540, the MMX 550, and the CM 560 may be at least a portion of a server system for providing the conference service. The AS 530, the VMX 540, the MMX 550, and the CM 560 may be included in a single server, or may be distributed in a plurality of servers.

Figure 5:
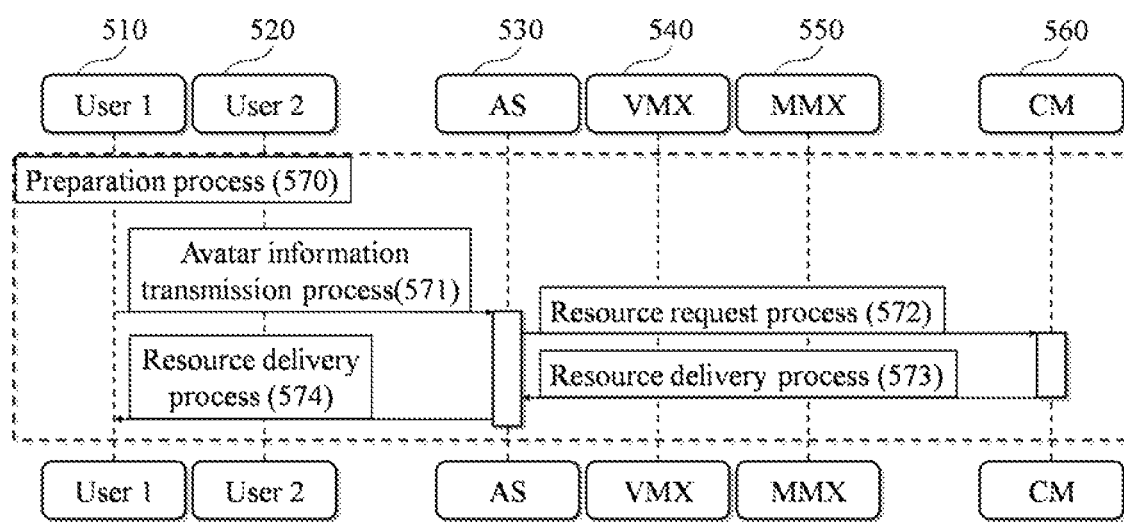
FIGS. 5, 6, 7 and 8 are diagrams of an avatar representation process according to an example embodiment.

Referring to FIG. 5, a preparation process 570 may include an avatar information transmission process 571, a resource request process 572, and resource delivery processes 573 and 574. In the avatar information transmission process 571, the first user 510 may deliver an identifier of an avatar and coordinate information of the avatar on a virtual space to the AS 530.

In the resource request process 572, the AS 530 may deliver the identifier and the coordinate information of the avatar to the CM 560 and may request resources of neighboring avatars. The CM 560 may record the identifier of the avatar and the coordinate information of the avatar delivered from each of users (the first user 510 and the second user 520 in the example embodiment) participating in the conference and may acquire the coordinate information of the entire avatars to be represented in the virtual space. Here, the CM 560 may select avatars present within a preset distance based on the coordinate information of the avatar of the first user 510 as neighboring avatars and may verify resources of the selected neighboring avatars.

In the resource delivery processes 573 and 574, the CM 560 may deliver the resources of the neighboring avatars to the first user 510 through the AS 530. Therefore, the second user 520 may represent one of the neighboring avatars present around the avatar of the first user 510.

Although FIG. 5 illustrates an example in which the preparation process 570 is performed for the first user 510, the preparation process 570 may be performed for each of participants of the conference.

Figure 6:
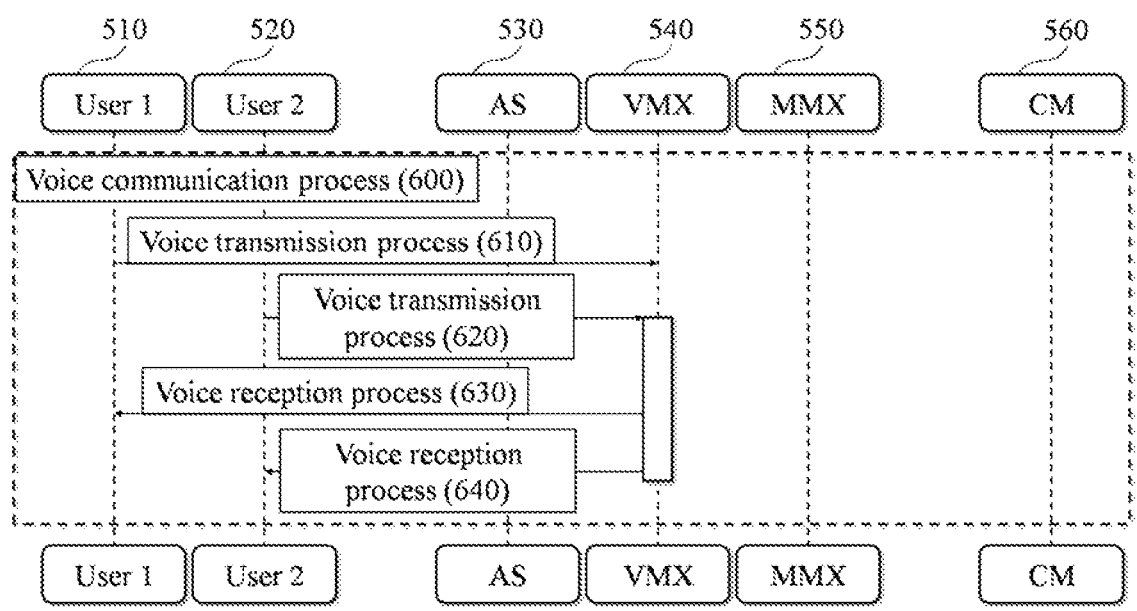

Referring to FIG. 6, a voice communication process 600 may include voice transmission processes 610 and 620 and voice reception processes 630 and 640. This voice communication process 600 may be optionally used to enable a voice conversation between participants. That is, when the voice conversation between the participants is not provided, the voice communication process 600 may be omitted.

In the voice transmission processes 610 and 620, each of the first user 510 and the second user 520 may transmit his/her own voice to the VMX 540. Here, transmission of voice may be premised on a case in which voices are recognized from participants of the conference. For example, unless the voice of the second user 520 is recognized, the voice transmission process 620 from the second user 520 to the VMX 540 may be omitted.

In the voice reception processes 630 and 640, each of the first user 510 and the second user 520 may receive the mixed voice from the VMX 540. Here, the mixed voice may refer to an audio in which remaining voices excluding his or her own voice are mixed. For example, it is assumed that voices are simultaneously transmitted from users A, B, C, D, and E to the VMX 540. In this case, the VMX 540 may transmit, to the user A, an audio in which voices of the users B, C, D, and E excluding the voice of the user A are mixed, or alternatively, an audio in which voices of the users A, B, C, D, and E are mixed.

As described above, the voice communication process 600 may be optionally used to enable the voice conversation between the participants. Also, a video communication process 700 of FIG. 7 and a new avatar processing process 800 of FIG. 8 may be performed in parallel with the voice communication process 600.

Figure 7:
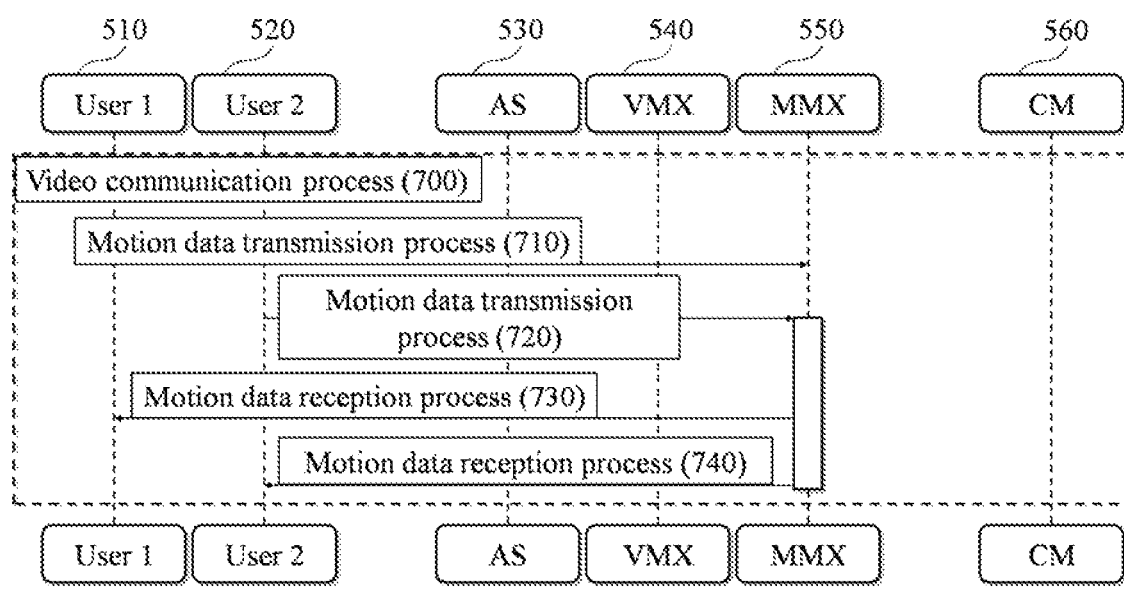

Referring to FIG. 7, the video communication process 700 may include motion data transmission processes 710 and 720 and motion data reception processes 730 and 740.

In the motion data transmission processes 710 and 720, each of the first user 510 and the second user 520 may transmit his or her own motion data to the MMX 550. The motion data may be acquired from an image captured through a camera in each of the first user 510 and the second user 520. The motion data may include data related to at least one of a pose and a facial expression of a corresponding user. As another example embodiment, the motion data may include data of a motion selected by the corresponding user from among a plurality of preset motions. As still another example embodiment, the motion data may be extracted from an image or a video prestored in a terminal of the corresponding user or prestored on the web.

In the motion data reception processes 730 and 740, the first user 510 and the second user 520 may receive motion data of the neighboring avatars from the MMX 550. For example, it is assumed that an identifier of an avatar of the first user 510 is CID 1 and an identifier of an avatar of the second user 520 is CID 2. Here, the first user 510 may receive motion data of neighboring avatars selected for CID 1, and the second user 520 may receive motion data of neighboring avatars selected for CID 2.

Here, each of the first user 510 and the second user 520 may represent the neighboring avatars as well as his or her own avatar on the virtual space for the conference based on resources and the motion data of the neighboring avatars. In addition, using dynamic data, motions (poses and/or facial expressions) of the participants of the conference may be applied to corresponding avatars in real time. To this end, as described above, a transmission and reception process of the motion data may be performed using an RTSP and the motion data may be framed for the RTSP.

Figure 8:
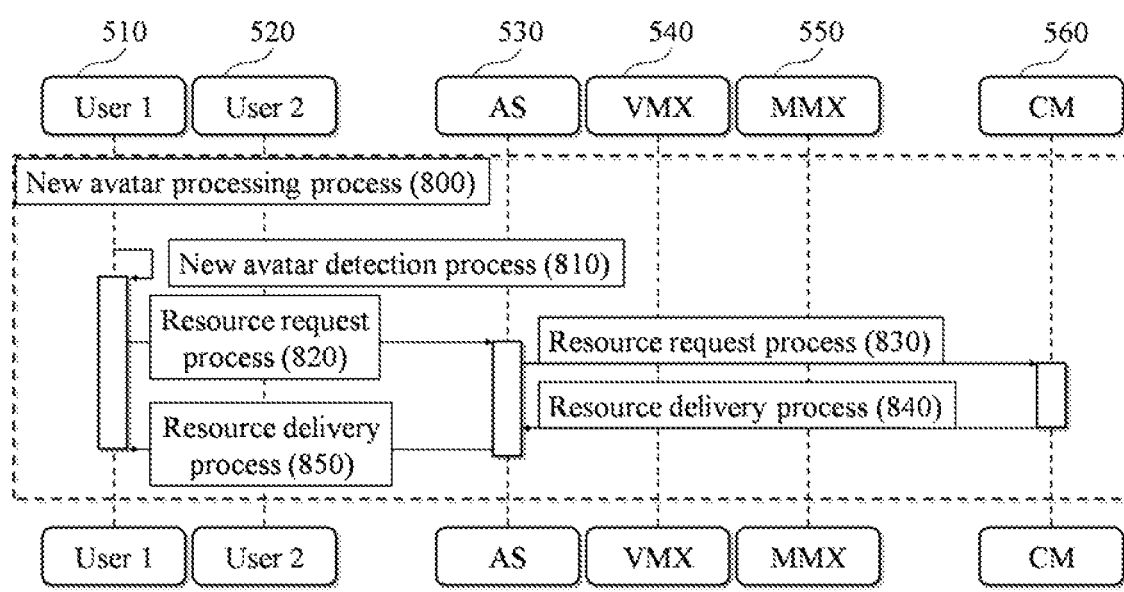

Referring to FIG. 8, the new avatar processing process 800 may include a new avatar detection process 810, resource request processes 820 and 830, and resource delivery processes 840 and 850.

In the new avatar detection process 810, the first user 510 may detect appearance of a new neighboring avatar through identifiers of avatars maintained by the first user 510 when receiving motion data of a neighboring avatar.

In the resource request processes 820 and 830, the first user 510 may request the AS 530 for a resource of the new neighboring avatar. The request for the resource may be delivered to the CM 560 through the AS 530.

In the resource delivery processes 840 and 850, the CM 560 may deliver the requested resource of the new neighboring avatar to the first user 510 through the AS 530.

Through the new avatar processing process 800, the first user 510 may represent avatars that newly appear as neighboring avatars. Although FIG. 8 illustrates an example in which the new avatar processing process 800 is performed for the first user 510, the new avatar processing process 800 may be performed for all of users in the conference that detect a new neighboring avatar.

Figure 9:
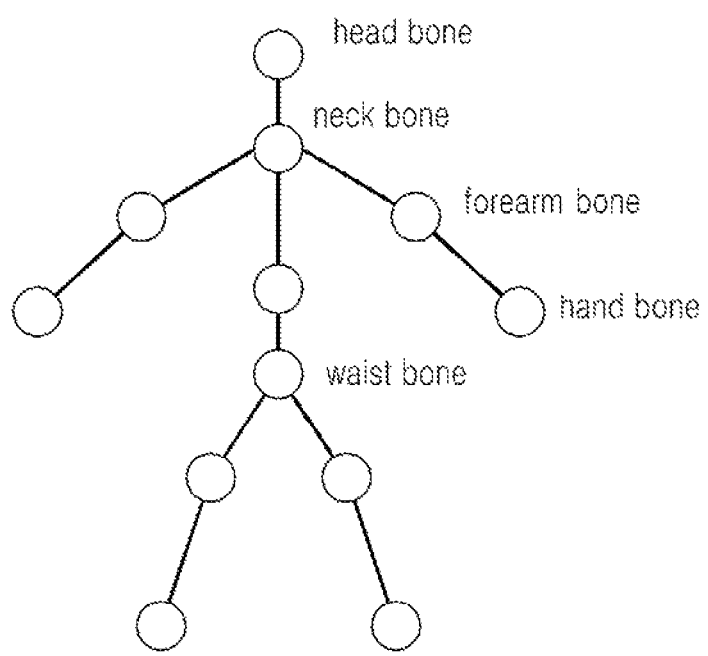
FIG. 9 is a diagram of an example of a bone structure of an avatar according to an example embodiment.

FIG. 9 is a diagram of an example of a bone structure of an avatar according to an example embodiment. Table 1 shows an example of a data structure for expressing a pose as motion data. From perspective of a single frame of a video in which an avatar is represented, only a pose of the avatar may be represented in the corresponding frame and a motion of the avatar may be implemented by poses of the avatar connected through connection such frames.

TABLE 1

| Key | Description |
|---|---|
| Bone index | A number of a bone that constitutes an avatar |
| Rotation information (qx, qy, qz, qw) | Quaternions x, y, z, and w that represent rotation information in a 3D space |
| Position information (tx, ty, tz) | Position vectors x, y, and z that represent position information in a virtual space |
| Tracking state | A current tracking state of a bone (having paused, stopped, and tracking values) |
| Number of bones | A number of bones that constitute an avatar |
| fps | A number of pieces of motion data to be transmitted per second |

As described above, a pose of an avatar may be configured by including a plurality of bones, and the motion data may include an index of each of the plurality of bones, rotation information of each of the plurality of bones in a 3D space, position information of each of the plurality of bones in the virtual space, and information on a current tracking state of each of the plurality of bones.

For example, with the assumption that motion data is transmitted at 10 fps, the motion data may be transmitted ten times per second. Here, each piece of motion data may include a bone index, rotation information of each bone, position information of each bone, and information on a tracking state of each bone. In the case of an avatar that includes 11 bones as in the example embodiment of FIG. 8, the motion data transmitted once may include 11 bone indices, 11 pieces of rotation information, 11 pieces of position information, and 11 tracking states.

Also, as described above, the motion data may further include data related to facial expressions of avatars as well as poses of users. To this end, the motion data may include coefficient values calculated for a plurality of points predefined for a face of a person based on a face blendshape scheme. For example, 52 facial points may be defined as the plurality of points and each of the coefficient values may be calculated to have a value between 0.0 and 1.0. For example, for a point "eye", a value of 0.0 may correspond to a state in which eyes are closed and a value of 1.0 may correspond to a state in which the eyes are open as wide as possible. For motion data related to this facial expression, a number of transmissions may be determined based on set fps.

Figure 10:
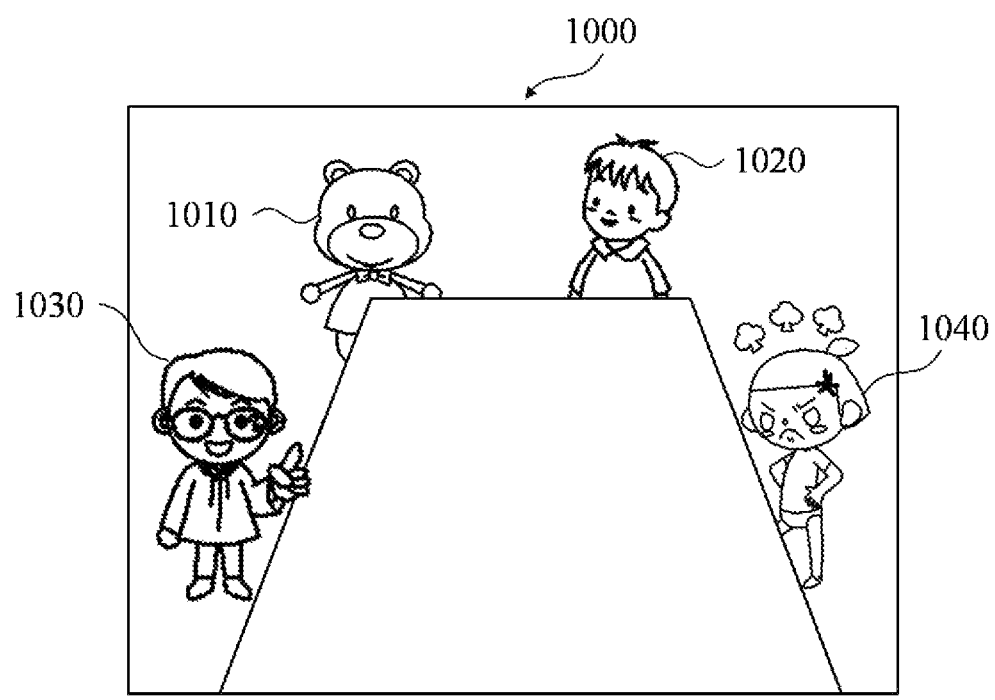
FIG. 10 is a diagram of an example of a conference conducted using an avatar according to an example embodiment.

FIG. 10 is a diagram of an example of a conference conducted using an avatar according to an example embodiment. FIG. 10 illustrates an example of a conference screen 1000. There is no need to display avatars of all participants that participate in the conference on the conference screen 1000. At least a portion of a virtual space corresponding to neighboring avatars 1020, 1030, and 1040 set based on a position of an avatar 1010 (e.g., the identified avatar) of a participant at which the corresponding conference screen 1000 is to be displayed may be displayed on the conference screen 1000. Here, motions including poses or facial expressions of the participants or motions desired by the participants may be applied in real time to the avatars 1010, 1020, 1030, and 1040 according to motion data of the avatars 1010, 1020, 1030 and 1040 delivered to a server in real time. That is, instead of simply displaying avatars on a virtual space for a conference, the conference to which motions of users are applied in real time may be conducted.

As described above, according to some example embodiments, it is possible to represent avatars of participants following motions of the participants on a virtual space, on the virtual space sharable by the participants and to conduct a conference using the virtual space.

The systems and/or apparatuses described above may be implemented using hardware components, software components, and/or a combination thereof. For example, the apparatuses and components described herein may be implemented using one or more general-purpose or special purpose computers, for example, a processor, a controller, an ALU, a digital signal processor, a microcomputer, a FPGA, a programmable logic unit (PLU), a microprocessor, or any other device capable of responding to and executing instructions in a defined manner. A processing device may run an OS and one or more software applications that run on the OS. The processing device also may access, store, manipulate, process, and create data in response to execution of the software. For simplicity, the description of a processing device is used as singular; however, one skilled in the art will be appreciated that the processing device may include multiple processing elements and/or multiple types of processing elements. For example, the processing device may include multiple processors or a processor and a controller. In addition, different processing configurations are possible, such as parallel processors.

The software may include a computer program, a piece of code, an instruction, or some combinations thereof, for independently or collectively instructing or configuring the processing device to operate as desired. Software and/or data may be embodied in any type of machine, component, physical equipment, virtual equipment, a computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable storage mediums.

The methods according to some example embodiments may be configured in a form of program instructions performed through various computer methods and recorded in non-transitory computer-readable media. The media may include, alone or in combination with program instructions, data files, data structures, and the like. The media may continuously store computer-executable programs or may temporarily store the same for execution or download. Also, the media may be various types of recording devices or storage devices in a form in which one or a plurality of hardware components are combined. Without being limited to media directly connected to a computer system, the media may be distributed over the network. Examples of the media include magnetic media such as hard disks, floppy disks, and magnetic tapes; optical media such as CD-ROM and DVDs; magneto-optical media such as floptical disks; and hardware devices that are specially configured to store and perform program instructions, such as ROM, RAM, flash memory, and the like. Examples of other media may include recording media and storage media managed by an app store that distributes applications or a site, a server, and the like that supplies and distributes other various types of software.

The foregoing embodiments are merely examples and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A non-transitory computer-readable recording medium storing instructions that, when executed by a processor, cause the processor to:
   set a communication session for a conference in which a plurality of users participates through a server;
   transmit, to the server, an identifier of an avatar to be represented on a virtual space for the conference and coordinate information of the avatar in the virtual space;
   receive, from the server, resources of neighboring avatars selected as being within a preset distance in the virtual space from the avatar based on the coordinate information of the avatar in the virtual space while excluding resources from other avatars outside the preset distance;
   transmit, to the server, motion data of the avatar through the communication session;
   receive, from the server, motion data of the neighboring avatars through the communication session; and
   represent the neighboring avatars on the virtual space based on the resources of the neighboring avatars and the motion data of the neighboring avatars.

2. The non-transitory computer-readable recording medium of claim 1, wherein the instructions, when executed, further cause the processor to:
   display the virtual space on which the avatar and the neighboring avatars are represented on a screen.

3. The non-transitory computer-readable recording medium of claim 1, wherein the instructions, when executed, further cause the processor to receive the motion data in real time based on a real-time transmission protocol.

4. The non-transitory computer-readable recording medium of claim 1, wherein the instructions, when executed, further cause the processor to:
   in response to receiving motion data of a new neighboring avatar, transmitting, to the server, a request for a resource of the new neighboring avatar; and
   receive the resource of the new neighboring avatar from the server.

5. The non-transitory computer-readable recording medium of claim 1, wherein the instructions, when executed, further cause the processor to:
   share voices of the plurality of users through the communication session or another communication session set separate from the communication session.

6. The non-transitory computer-readable recording medium of claim 1, wherein the motion data comprises data related to at least one of poses and facial expressions of the plurality of users.

7. The non-transitory computer-readable recording medium of claim 1, wherein a pose of the avatar is configured to include a plurality of bones, and
   wherein the motion data comprises an index of each of the plurality of bones, rotation information of each of the plurality of bones in a three-dimensional (3D) space, position information of each of the plurality of bones in the virtual space, and information on a current tracking state of each of the plurality of bones.

8. The non-transitory computer-readable recording medium of claim 1, wherein the motion data comprises coefficient values calculated for a plurality of points predefined for a face of a person based on a face blendshape scheme.

9. A conference processing method comprising:
   setting a communication session for a conference in which a plurality of users participates through a server;
   transmitting, to the server, an identifier of an avatar to be represented on a virtual space for the conference and coordinate information of the avatar in the virtual space;
   receiving, from the server, resources of neighboring avatars selected as being within a preset distance in the virtual space from the avatar based on the coordinate information of the avatar in the virtual space while excluding resources from other avatars outside the preset distance;
   transmitting, to the server, motion data of the avatar through the communication session;
   receiving, from the server, motion data of the neighboring avatars through the communication session; and
   representing the neighboring avatars on the virtual space based on the resources of the neighboring avatars and the motion data of the neighboring avatars.

10. A conference processing method comprising:
    setting a communication session for a conference in which a plurality of users participates;

receiving, for each of the plurality of users, an identifier of an avatar to be represented on a virtual space for the conference and coordinate information of the avatar in the virtual space;

selecting neighboring avatars of an identified avatar as being within a preset distance in the virtual space from the identified avatar based on the coordinate information;

transmitting resources of the selected neighboring avatars to a terminal of a user corresponding to the identified avatar while excluding resources from other avatars outside the preset distance;

receiving motion data of avatars from each of the plurality of users through the communication session; and transmitting the motion data of the selected neighboring avatars to the terminal of the user corresponding to the identified avatar through the communication session.

11. The conference processing method of claim 10, wherein the receiving of the motion data of avatars through the communication session comprises receiving motion data generated from terminals of the plurality of users based on a real-time transmission protocol in real time, and wherein the transmitting of the motion data of the selected neighboring avatars comprises transmitting the motion data of the selected neighboring avatars to the terminal of the user corresponding to the identified avatar based on the real-time transmission protocol.

12. The conference processing method of claim 10, further comprising:

in response to the terminal of the user receiving motion data of a new neighboring avatar, receiving a resource request comprising an identifier of the new neighboring avatar from the terminal of the user corresponding to the identified avatar;

acquiring a resource of the new neighboring avatar based on the identifier of the new neighboring avatar; and transmitting the acquired resource to the terminal of the user corresponding to the identified avatar.

13. The conference processing method of claim 10, further comprising:

mixing voices received from the plurality of users through the communication session or another communication session set separate from the communication session, and providing the mixed voices to the plurality of users.

14. The conference processing method of claim 10, wherein the motion data comprises data related to at least one of poses and facial expressions of the plurality of users.

15. The conference processing method of claim 10, wherein the terminal of the user corresponding to the identified avatar is configured to represent the selected neighboring avatars on the virtual space based on the resources of the selected neighboring avatars and the motion data of the selected neighboring avatars, and wherein the virtual space on which the identified avatar and the neighboring avatars are represented is displayed on a screen.

16. A server comprising:

at least one memory storing instructions; and at least one processor configured to execute the instructions to:

provide a virtual space for a video conference in which a plurality of users participates;

obtain an identifier of an avatar of each of the plurality of users and coordinate information of the avatar in the virtual space;

receive motion data of the avatar of each of the plurality of users from a terminal of each of the plurality of users;

update at least one of a position, a pose, and a facial expression of the avatar of each of the plurality of users in the virtual space, based on the motion data of the avatar of each of the plurality of users;

select neighboring avatars of an identified avatar as being within a preset distance in the virtual space from the identified avatar based on the coordinate information;

transmit resources of the selected neighboring avatars to a terminal of a user corresponding to the identified avatar while excluding resources from other avatars outside the preset distance; and transmit the motion data of the selected neighboring avatars to the terminal of the user corresponding to the identified avatar.

17. The server of claim 16, wherein the at least one processor is further configured to execute the instructions to:

receive the motion data from the terminal of each of the plurality of users based on a real-time transmission protocol, and update the at least one of the position, the pose, and the facial expression of the avatar of each of the plurality of users in real time.

18. The server of claim 16, wherein the at least one processor is further configured to execute the instructions to:

mix voices received from the plurality of users, and provide the mixed voices to the plurality of users through the video conference.

19. The non-transitory computer-readable recording medium of claim 1, wherein the number of neighboring avatars is fewer than an overall number of avatars in the virtual space.

20. The conference processing method of claim 10, wherein the number of neighboring avatars is fewer than an overall number of avatars in the virtual space.

* * * * *